United States Patent
Anders et al.

(10) Patent No.: US 10,286,589 B2
(45) Date of Patent: May 14, 2019

(54) CALIBRATION DEVICE AND METHOD AS WELL AS A TANK CALIBRATOR FOR PROFILE EXTRUSION

(71) Applicant: GREINER TOOL.TEC GMBH, Nussbach (AT)

(72) Inventors: Gerhard Anders, Ried (AT); Bernhard Fischer, Wartberg (AT)

(73) Assignee: GREINER TOOL.TEC GMBH, Nussbach (AT)

( * ) Notice: Subject to any disclaimer, the term of this patent is extended or adjusted under 35 U.S.C. 154(b) by 788 days.

(21) Appl. No.: 14/427,283

(22) PCT Filed: Sep. 11, 2013

(86) PCT No.: PCT/EP2013/068770
§ 371 (c)(1),
(2) Date: Mar. 10, 2015

(87) PCT Pub. No.: WO2014/041008
PCT Pub. Date: Mar. 20, 2014

(65) Prior Publication Data
US 2015/0246474 A1    Sep. 3, 2015

(30) Foreign Application Priority Data
Sep. 13, 2012   (DE) .................. 10 2012 216 299

(51) Int. Cl.
*B29C 47/92*    (2006.01)
*B29C 47/00*    (2006.01)
(Continued)

(52) U.S. Cl.
CPC ............ *B29C 47/92* (2013.01); *B29C 47/003* (2013.01); *B29C 47/8815* (2013.01);
(Continued)

(58) Field of Classification Search
CPC ....... B29C 47/92; B29C 47/90; B29C 47/905; B29C 47/904; B29C 47/903;
(Continued)

(56) References Cited

U.S. PATENT DOCUMENTS 5,288,218 A    2/1994  Melkonian
6,244,847 B1   6/2001  Wegmaier et al.
(Continued)

FOREIGN PATENT DOCUMENTS

AT    411 825 B      6/2004
DE    1 291 896 B    4/1969
(Continued)

OTHER PUBLICATIONS

EP Office Action dated Oct. 16, 2018 as received in Application No. 13773634.4.

*Primary Examiner* — Yogendra N Gupta
*Assistant Examiner* — Ninh Le
(74) *Attorney, Agent, or Firm* — Maschoff Brennan

(57) ABSTRACT

A calibration device for the extrusion of profiles from plastics is provided. The calibration device comprises at least one tank calibrator with an opening and a running surface for the extruded profile, which can be arranged in a vacuum tank with cooling water and via whose outer surface the heat of the extruded profile can at least partly be transferred to the cooling water. The at least one tank calibrator includes at least one cooling channel for cooling the running surfaces and the axial length of the tank calibrator at least corresponds to the height and/or the width of the nominal dimension of the profile.

18 Claims, 8 Drawing Sheets

(51) Int. Cl.
  *B29C 47/88* (2006.01)
  *B29C 47/90* (2006.01)
  *B29C 47/08* (2006.01)
  *B29L 31/00* (2006.01)

(52) U.S. Cl.
  CPC .......... *B29C 47/8855* (2013.01); *B29C 47/90* (2013.01); *B29C 47/908* (2013.01); *B29C 47/0808* (2013.01); *B29C 47/8835* (2013.01); *B29C 47/8865* (2013.01); *B29C 47/8895* (2013.01); *B29C 47/903* (2013.01); *B29C 47/904* (2013.01); *B29C 47/905* (2013.01); *B29C 2947/92019* (2013.01); *B29C 2947/92428* (2013.01); *B29C 2947/92514* (2013.01); *B29C 2947/92923* (2013.01); *B29L 2031/001* (2013.01)

(58) Field of Classification Search
  CPC ............ B29C 47/0808; B29C 47/8855; B29C 47/8815; B29C 47/908; B29C 47/003; B29C 47/8835; B29C 47/8895; B29C 47/8865; B29C 2947/92428; B29C 2947/9293; B29C 2947/92019; B29C 2947/92514
  See application file for complete search history.

(56) References Cited

U.S. PATENT DOCUMENTS

| | | | |
|---|---|---|---|
| 6,287,102 | B1 | 9/2001 | Greiner |
| 6,779,994 | B2 | 8/2004 | Krumböck et al. |
| 6,814,559 | B2 | 11/2004 | Kossl |
| 7,371,062 | B2 | 5/2008 | Krumbock |
| 2003/0031743 | A1 | 2/2003 | Krumböck et al. |
| 2004/0071804 | A1 | 4/2004 | Klein |
| 2006/0034966 | A1* | 2/2006 | Schwaiger .......... B29C 47/0028 425/326.1 |
| 2009/0026653 | A1* | 1/2009 | Kossl .................... B29C 47/003 264/209.5 |

FOREIGN PATENT DOCUMENTS

| | | |
|---|---|---|
| DE | 19 66 994 A1 | 3/1976 |
| DE | 102 24 461 A1 | 1/2003 |
| EP | 0 925 905 A1 | 6/1999 |
| EP | 1 363 762 A2 | 11/2003 |
| EP | 1 284 181 B1 | 9/2004 |
| GB | 2 015 418 A | 9/1979 |
| JP | H02-293117 A | 12/1990 |
| JP | 2010-058363 A | 3/2010 |
| WO | 97/27991 A1 | 8/1997 |
| WO | 2004/041512 A1 | 5/2004 |

* cited by examiner

CALIBRATION DEVICE AND METHOD AS WELL AS A TANK CALIBRATOR FOR PROFILE EXTRUSION

CROSS-REFERENCE TO A RELATED APPLICATION

This application is a National Phase Patent Application of International Patent Application Number PCT/EP2013/068770, filed on Sep. 11, 2013, which claims priority of German Patent Application Number 10 2012 216 299.2, filed on Sep. 13, 2012.

BACKGROUND

This invention relates to a calibration device, a calibration method and a dry calibrator.

Profiles of thermoplastic materials (e.g. PVC) generally are manufactured by means of extrusion. Shaping of a profile requires a nozzle and a calibration device.

Calibration devices for manufacturing plastic profiles, e.g. window profiles, usually include a dry and a wet calibration device, wherein after exit from the nozzle the hot extrudate first passes through the dry calibration device and subsequently through the wet calibration device. At the end of calibration and after complete cooling of the profile to room temperature, the profile must have the desired contour, i.e. the profile must have the nominal dimensions.

The wet calibration device includes a plurality of vacuum tanks arranged in series, in which extensive cooling of the profile is effected by direct contact with the cooling water, after the same has partly been cooled already in the dry calibration. Usually, so-called short calibrators or covers are arranged in a vacuum tank of the wet calibration device at intervals of about 100 mm on the inlet side and about 500 mm on the outlet side, which each have a through opening which largely corresponds to the geometry of the profile.

The vacuum tanks as such are closed on all sides. Covers with openings for the entry and exit of the profile only are arranged at the end faces. The vacuum tanks are charged with negative pressure (order of magnitude about 30 to 100 mbar), whereby the profile is slightly "bloated" and rests against the through openings of the covers. The profile thus cools down in a defined shape, which ensures dimensional stability.

The cooling water flows through the vacuum tanks proceeding from few supply lines down to few discharge lines.

The negative pressure only must be applied via a negative pressure port and then each acts in the entire interior space of a vacuum tank. The manufacturing effort for the short calibrators (covers) is comparatively low, because the same do not require any supply and distribution bores for negative pressure and cooling water.

The dry calibration upstream of the wet calibration includes at least one dry calibration device, wherein e.g. up to eight dry calibration devices can be arranged in series.

The dry calibration devices include through openings with running surfaces for a contact with the extrudate, which approximately corresponds to the contour of the profile. In detail, however, dimensional or geometrical differences do exist, in order to follow the reduction in length with decreasing temperature of the plastic and in order to compensate the distortion as a result of different cooling rates.

The dry calibration devices are supplied with negative pressure and with cooling water. The negative pressure applied at the running surfaces effects that the profile is sucked against the same. The negative pressure acts via so-called vacuum slots between profile and dry calibration device and ensures that the profile rests against the running surface without clearance, so that said profile assumes a defined outer contour. Within the calibration, a flow connection to the vacuum pumps is created via connection and distribution bores. Outside the dry calibration devices, the transmission of the negative pressure is effected by means of hoses and connecting points.

As a result of the close contact of the profile on the running surface to the dry calibration device, a heat transfer from the hot profile to the cold dry calibration device is effected.

To prevent or minimize a rise in temperature of the dry calibration devices, the same are cooled, mostly continuously. This is effected by passing cooling water through cooling channels located close to the running surface. Each of these cooling channels requires a supply line and a discharge line for the cooling water, wherein it is possible however to combine several cooling channels. Thus, for each cooling circuit two water ports are required, each for the supply line and for the discharge line.

The maintenance of the desired operating state of the dry calibration devices requires a considerable additional effort during manufacture in addition to the required minimum requirement with regard to the geometry of the running surface, in order to be able to ensure and reproduce the required negative pressure and cooling, which in particular concerns the manufacture of distribution bores for the negative pressure and for the cooling water supply and discharge lines. Each port requires corresponding coupling points (couplings) and connecting hoses, which during a change of the calibration must be disconnected and connected with regard to a different profile geometry. In addition, certain settings with regard to the flow rate or height of the negative pressure must be maintained, whereby corresponding cocks also must be provided for each port. In general, the expenditure during manufacture and operation of the conventional dry calibrations is high.

It therefore is the object to create a calibration device which has a simple design and to create a calibration method which is easy to carry out.

SUMMARY

The novel invention on the one hand should reduce the manufacturing effort for the calibration and on the other hand facilitate the handling of the calibration during the extrusion.

The object is solved by a calibration device for the extrusion of profiles from plastics with the features as described herein.

There is used at least one tank calibrator with an opening and a running surface for the extruded profile, which can be arranged in a vacuum tank with cooling water and via whose outer surface the heat of the extruded profile can at least partly be transferred to the cooling water. The outside of the at least one tank calibrator is in contact with cooling water, so that cooling of the extruded profile must be effected not only by the additionally present at least one cooling channel in the interior of the tank calibrator. The direct dissipation of the heat from the tank calibrator into the cooling water of the vacuum tank allows a space-saving construction and an efficient operation. Furthermore, the axial length of the tank calibrator at least corresponds to the height and/or the width of the nominal dimension of the profile which is guided through the tank calibrator. This ensures a sufficient length and hence a sufficient heat transfer surface.

The outside dimensions of the tank calibrator thus can be chosen smaller than in a dry calibrator, because less space is required for accommodating the distribution lines for the negative pressure and for the cooling water. It is an additional advantage when the outside dimensions are chosen as small as possible, because then the dissipation of heat via the outer surfaces to the surrounding cooling water becomes more effective.

Vacuum slots and various supply lines for the same can be omitted entirely. The tank calibrators are accommodated in a vacuum tank which as a whole is put under negative pressure.

It is particularly advantageous when the at least one cooling channel is connectable to a cooling water delivery or the cooling channel can passively be flown through by cooling water. Passive throughflow here should mean that the flowing water is not directly delivered through the cooling channel by an external pump, but that the existing flow energy of an upstream device, e.g. another cooling channel, is exploited without new energy being supplied.

It therefore is advantageous when the at least one cooling channel is flown through by water which originates from a cooling channel of a device located upstream or downstream in relation to the extrusion direction.

In an advantageous embodiment, tank calibrators can be charged with cooling water via ports on the outsides, wherein the cooling water on the end face exits from the cooling channels located close to the running surface.

To avoid vacuum losses, it is advantageous when at least one sealing element is arranged at the transition between a first tank calibrator and a second dry calibrator (adjacent in upstream direction). It is advantageous when the at least one sealing element is formed as axially acting O-ring seal and/or as sealing lip. In the case of sealing by a sealing lip on the end face, the sealing effect automatically is increased when a negative pressure is applied.

To improve the sealing effect it is advantageous when an axially acting seal includes two sealing elements acting in series and that the space formed by the two sealing elements is chargeable either by negative pressure or by water.

Alternatively or in addition, the sealing effect can be monitored by a manometer for measuring the pressure in a space between two sealing elements.

It is also advantageous when the vacuum tank is designed in a sealing manner, in order to largely inhibit the entry of false air in particular at the sealing end-face connecting points to the succeeding vacuum tank and at the dry calibration device positioned before the same.

For an efficient operation it is advantageous when the negative pressure in the vacuum tank is adjustable and/or controllable between 0.05 to 0.8 bar, preferably between 0.1 to 0.5 bar.

It is also advantageous when the height of the water level in the vacuum tank is adjustable and/or controllable such that the same is higher than the extruded profile and the tank calibrators.

For an efficient pressurization in the vacuum tank it is advantageous when a water suction opening for the cooling water is in line connection with a water pump and that a check valve is arranged on the pressure side of the water pump. The check valve prevents that air is sucked in from outside, when a vacuum is applied at the vacuum tank.

It is particularly advantageous when between an air cavity of the vacuum tank and the water pump a pressure compensation line is arranged, which joins in before the water inlet or behind the water inlet and before the check valve of the water pump. It hence is possible to drain air bubbles which have formed in the vicinity of the water pump, so that a proper delivery capacity of the water pump is ensured.

It is also advantageous when the water throughput capacity of the water pump is controllable in dependence on the height of the water level in the vacuum tank.

For an easier access, e.g. during maintenance, it is advantageous when the vacuum tank is equipped with a removable side wall on one long side or on both long sides.

Advantageously, the distance between two tank calibrators is between 0 and 50 mm, preferably between 0.1 and 5 mm. With these distances it is possible that cooling water flowing through cooling channels enters into downstream cooling channels, i.e. a passive throughflow occurs without a new energy supply being necessary.

Advantageously, a tank calibrator device is coupled with a dry calibrator device with one to four dry calibrators.

Advantageously, the axial length of the at least one tank calibrator is at least 200 mm, in particular 100 mm.

The object also is solved by a calibration method with the features as described herein. The extruded profile first is guided through a dry calibration device and through a tank calibration device according to the invention as described herein.

The object also is solved by tank calibrator with the features as described herein.

The tank calibrator includes an opening and running surfaces for an extruded profile and is particularly formed for use in a calibration device as described herein or for use in a calibration method as described herein.

BRIEF DESCRIPTION OF THE DRAWINGS

Exemplary embodiments of the invention will be explained with reference to Figures.

DETAILED DESCRIPTION

In the following it is shown with reference to various embodiments how the use of so-called tank calibration devices 20 can lead to a simplification of the calibration device.

Figure 1:
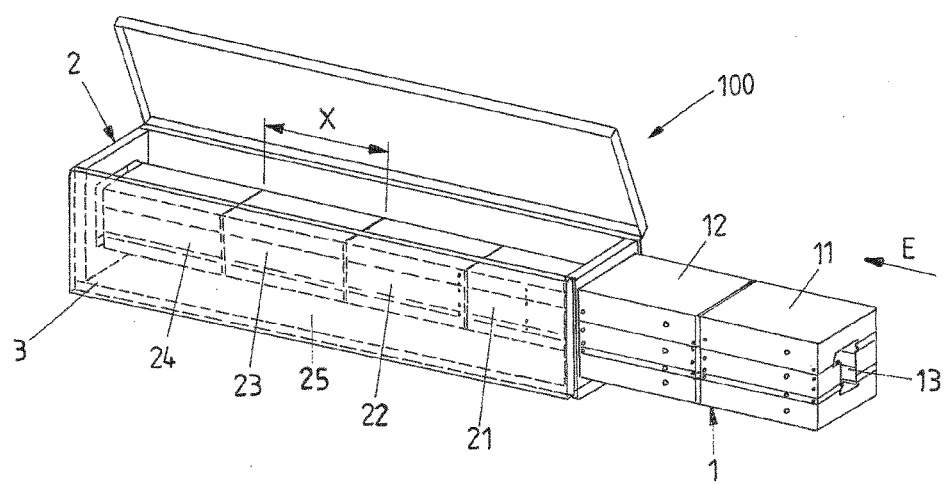
FIG. 1 shows a perspective representation of a dry calibration device with downstream tank calibration device.
Figure 2:
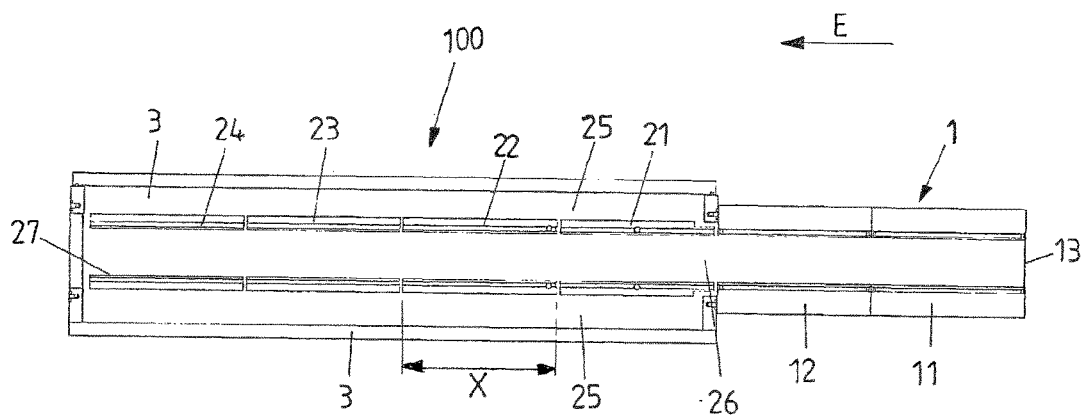
FIG. 2 shows a sectional view through the embodiment according to FIG. 1.

FIG. 1 shows the inlet-side region (arrow E indicates the extrusion direction) of a calibration device 100, wherein the wet calibration device, which follows the same, consisting of up to six vacuum tanks with covers arranged on the inside, is not shown. FIG. 2 shows a sectional view through the calibration device 100.

The embodiment shown here includes a tank calibration device 2 with four tank calibrators 21, 22, 23, 24, wherein on the inlet-side end wall a sealing is provided towards the upstream dry calibration device 1 with two dry calibrators 11, 12.

The extrusion direction E extends from the right to the left. The preformed melt strand (extrudate), not shown here, exits from a likewise non-illustrated nozzle and initially gets into the dry calibration device 1. In the embodiment shown, the same includes two individual dry calibrators 11, 12. Each dry calibrator 11, 12 includes an opening 13 in its interior, through which the profile is guided. When reference is made in the following to dimensions of the profile, this refers to the dimensions of the openings 13 through which the extruded profile passes.

The cross-section of this opening 13 for the profile geometrically is closely adapted to the desired profile contour (i.e. the nominal dimensions), but changes slightly in longitudinal direction, in order to compensate the shrinkage and the distortion of the profile as a result of cooling.

The profile rests against the running surface of the dry calibrators 11, 12 as a result of an applied negative pressure and dissipates the heat to the calibration.

As can be taken from this FIG. 1 and will yet be explained below, each dry calibrator 11, 12 includes supply bores for "cooling water ON", "cooling water OFF" and for negative pressure. These supply bores also are combined from case to case. This means that an in-coming port is branched in the interior of the dry calibrator 11, 12, whereby less external ports are to be decoupled and coupled when changing the profile. The longitudinal bores, which are arranged close to the running surface, must be closed on the end face, so that the water cannot exit there and is forced to systematically flow through all cooling channels from the inlet opening to the outlet opening.

The cooling channels do not always have to extend in axial direction. Depending on the constructive circumstances, the same also can extend vertically or obliquely to the extrusion axis or be formed meandrous.

Subsequent to the dry calibration device 1, the embodiment of the calibration device 100 as shown in FIGS. 1 and 2 includes a comparatively short vacuum tank 3 in which further calibrators, the tank calibrators 21, 22, 23, 24 are provided.

With respect to the running surface and the effect on the profile of the dry calibrators 11, 12, these tank calibrators 21, 22, 23, 24 however, can be produced at lower cost as compared to the same, since cooling is effected not alone via channels flown-through by cooling water, but by a water bath 25. This will yet be explained below.

The savings relate to smaller outside dimensions and cross-sectional dimensions and less supply and distribution bores for the cooling water and for the vacuum.

To make the profile in the region of the hollow chambers rest against the running surface of the tank calibrators 21, 22, 23, 24, the entire vacuum tank 3 is put under a negative pressure of about 0.1 to 0.5 bar.

The dissipation of heat from the profile is effected via the outer surface of the tank calibrators 21, 22, 23, 24 into the cooling water in the water bath 25, so that still existing cooling channels 29, which are arranged close to the running surface 27, can be formed relatively small.

In some tank calibrators 21, 22, 23, 24, these cooling channels 29 alternatively or in addition can actively be charged with cooling water by connecting the cooling channels with a cooling water delivery.

It is also possible that the cooling channels 29 alternatively or in addition are passively supplied with cooling water by the cooling water flowing out of the respectively adjacent tank calibrator 21, 22, 23, 24. The downstream cooling channel 29 is flown through by water which originates from an upstream device, here another tank calibrator 21, 22, 23, 24.

The charged cooling water exits on one or on both end faces of the upstream tank calibrator 21, 22, 23, 24, depending on the special design and arrangement in the vacuum tank 3. The cooling water exiting from the axially aligned longitudinal channels on one end face has a certain impulse or a certain sweep, in order to enter into the analogous cooling channels of a succeeding, downstream tank calibrator 21, 22, 23, 24 and flow through its cooling channels.

Figure 7:
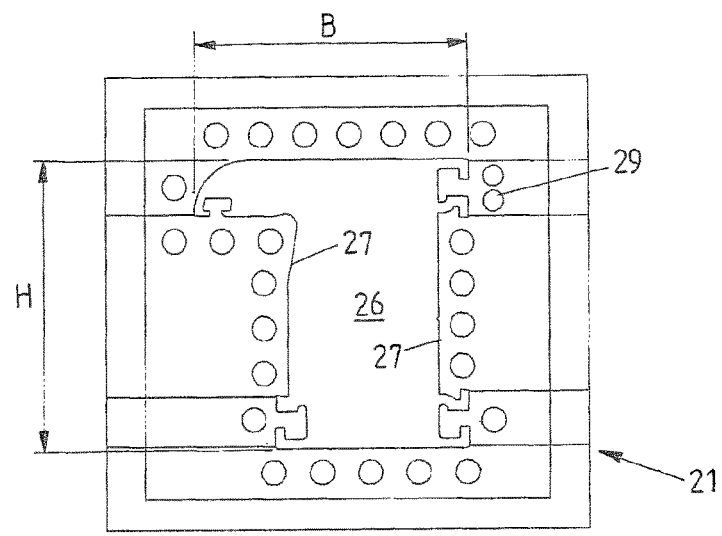
FIG. 7 shows a view of the end face of the tank calibrator according to FIG. 6.

The axial length X of the tank calibrators 21, 22, 23, 24 is greater than the height H or the width B of the profile (see e.g. FIG. 7). By this choice of the length a sufficiently large heat transfer surface is provided.

Between the tank calibrators 21, 22, 23, 24 in the illustrated embodiment only a small distance each exits, which is about 0.1 to 5 mm. In principle, however, distances up to 50 mm likewise are possible, even if only a reduced admission of cooling water to the adjacent tank calibrators 21, 22, 23, 24 is to be expected.

The smaller the negative pressure chosen in the vacuum tank 3, the larger the distances to be used between the tank calibrators 21, 22, 23, 24. At a distance of 50 mm, the negative pressure should rather not exceed 0.1 bar, at a distance of 5 mm negative pressures up to 0.5 bar have no negative effects.

Apart from the distance, the allowed pressure above all depends on the profile contour. Under unfavorable conditions, flat surfaces of the profile are bulged inadmissibly far to the outside, which should naturally be avoided.

Since the dissipation of heat from the profile massively decreases with increasing cooling of the outer layer of the profile, distinctly less heat is dissipated in the region of the tank calibrators 21, 22, 23, 24 than in the region of the dry calibrators. Thus, a very high throughput of cooling water through the cooling channels is not required either and an inadmissible heating of the tank calibrators 21, 22, 23, 24 nevertheless is inhibited.

On the inlet side, the first tank calibrator 21 should be sealed very well against the dry calibration device 1 and other machine parts, so that no air can enter. Entering air would attach to the profile surface and then be drawn in between profile surface and running surface of the tank calibrator 21, 22, 23, 24 in an uncontrolled manner. This air would then lead to a deterioration of the profile surface, because differences in gloss would be visible and marks would occur. The end face of the vacuum tank 3 therefore should seal very well against the end face of the dry calibration 1.

This can be effected e.g. with a circumferential seal, when the same is elastically deformable sufficiently and therefore can adapt very well to smaller unevennesses.

Figure 3:
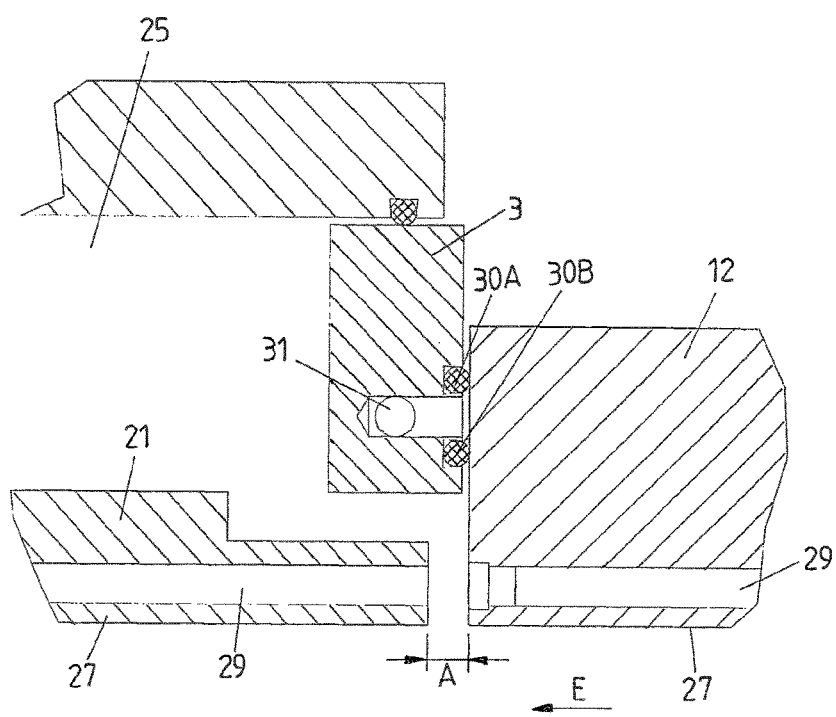
FIG. 3 shows a sectional view of a sealing on the inlet side to the vacuum tank for the tank calibrators with an O-ring seal.

FIG. 3 shows such seal in the detail of a sectional view. The section shows the transition from the last dry calibrator 12 to the first tank calibrator 21. Between the dry calibrator 12 and the tank calibrator 21 a distance A exists. Dry calibrator 12 and tank calibrator 21 are traversed by cooling channels 29, which each are arranged in the vicinity of the running surfaces 27.

It is advantageous when two axial sealing elements 30A, 30B are provided circumferentially, wherein the space which is defined by the two sealing elements 30A, 30B can be used for monitoring the effectiveness. FIG. 3 shows an embodiment in which the sealing elements 30A, 30B are arranged on the end face of the vacuum tank 3 as axial O-rings. Alternatively or in addition, sealing of the tank calibrator 21, 22, 23, 24 against the dry calibrator 12 also can be provided.

When this space is charged through the bore 31 with at least the same negative pressure with which the vacuum tank 3 itself is charged, no air can be sucked into the vacuum tank 3. In this case, some air can be sucked into the space from outside past the outer sealing element 30A, but the same is sucked off as intended. However, the same cannot advance inwards towards the vacuum tank 3, because there is no pressure gradient at the inner sealing element 30B.

In addition, the pressure in the space can be monitored by a manometer. As long as the same pressure is applied at this manometer as in the vacuum tank 3 itself, the outer sealing element 30A largely is effective, so that no pressure gradient occurs at the inner sealing element 30B in direction of the interior space of the vacuum tank 3. Even on detection of a small pressure difference between the two measured pressures, the risk of false air being sucked into the tank still is very small, because the sealing effect of the inner sealing element 30B still is fully effective.

Alternatively, the space can be charged with cooling water. Only a relatively small throughput or a small positive pressure (less than 0.5 bar) is required here, because the sealing effect of the sealing elements 30A, 30B against water is much more effective than against air. With moderate leakages, only water can be sucked into the vacuum tank and by no means air. A small exit of water to the outside is not disturbing either, because in the region near the calibration water frequently anyway flows openly into a water collection tray and is discharged.

Figure 4:
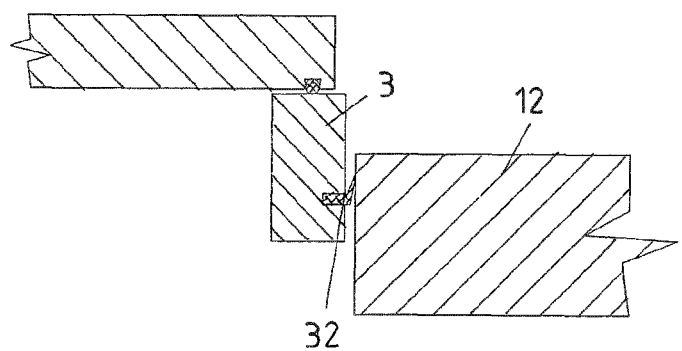
FIG. 4 shows a sectional view of a sealing on the inlet side to the vacuum tank for the tank calibrators with a lip seal (great distance).
Figure 5:
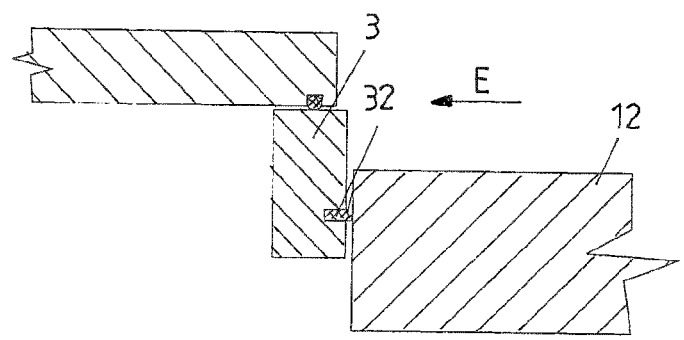
FIG. 5 shows a sectional view of a sealing on the inlet side to the vacuum tank for the tank calibrators with a lip seal (small distance).

Instead of an O-ring seal (or also in addition to the O-ring seal) a lip seal 32 also can be used as sealing element, in order to achieve the desired sealing effect, as is shown in FIGS. 4 and 5.

In FIGS. 4 and 5, the same section of the end wall of the vacuum tank 3 and a dry calibrator is shown as in FIG. 3. This lip seal 32 likewise can achieve the required sealing effect, as shown above with two annular O-ring seals 30A, 30B. The lip seal 32 has the advantage that the distance between the end walls to be sealed can have greater differences and nevertheless a good sealing effect is achieved. The sealing lip 32 shown in FIGS. 4 and 5 acts at distances between 1.8 and 3 mm. The negative pressure in the vacuum tank 3 effects that the sealing lip 32 automatically sucks tight to the end face, as soon as a contact to the same has only briefly been made.

Figure 6:
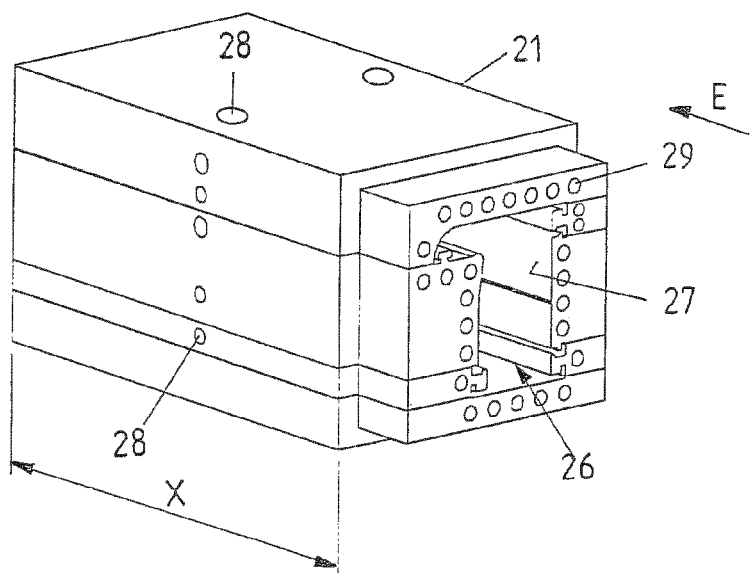
FIG. 6 shows a perspective representation of a tank calibrator.

FIG. 6 shows the first tank calibrator 21 with an axial length X in a perspective view. The front side is the end face with the opening 26 for the extruded profile, wherein in the assembly of the entire plant the end face cooperates with the dry calibrator 12 (not shown here). The opening 26 corresponds to the geometrical dimensions of the profile, which is not shown here.

FIG. 7 shows the end face of the tank calibrator 21 according to FIG. 6. In the view, the cooling channels 29 can be seen parallel to the running surfaces 27. The profile has a height H and a width B. The axial length of the tank calibrator 21 in this embodiment is greater than the width B and the height H.

Figure 8:
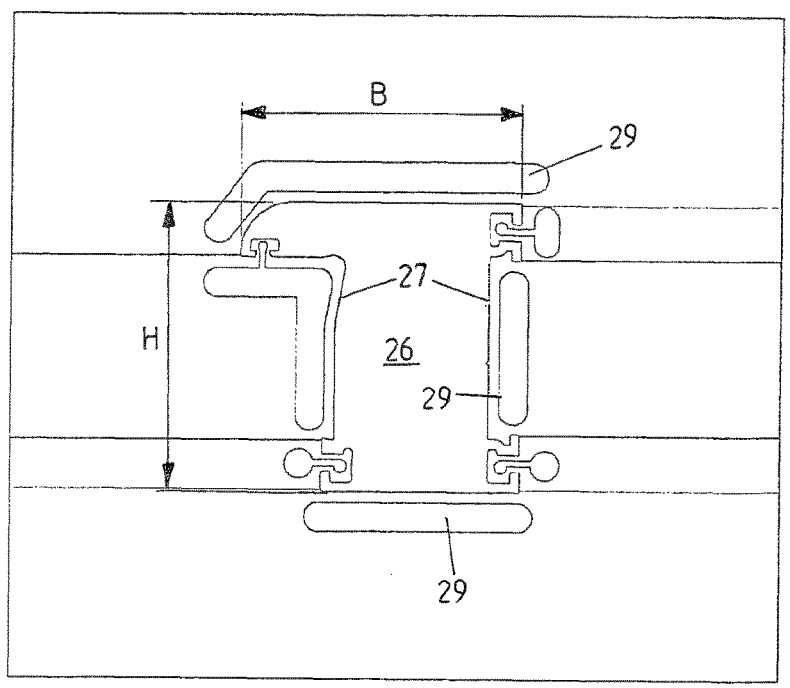
FIG. 8 shows a view of the end face of a dry calibration for comparison with the tank calibrator of FIG. 7.

For comparison of the outside dimensions, FIG. 8 shows a dry calibration known per se in an end view with the same scale.

In the conventional dry calibration according to FIG. 8, the outside dimensions are distinctly greater than the profile.

The projections laterally amount to about 60 mm, in height about 40 mm to the extreme points of the profile. These projections are required, in order to be able to accommodate the supply bores (not shown in FIG. 8) for the negative pressure and the cooling water, to screw together attachment parts and centering springs etc., and to perform the vertical screw connection.

In the tank calibrator 11, 12 according to FIG. 6 or 7, distinctly smaller outside dimensions are possible, because the internal parts are designed less expensive. In the embodiment of the invention according to FIG. 7, the lateral projection in height only is 30 mm. Smaller outside dimensions, i.e. thinner wall thicknesses, promote the dissipation of heat from the profile to the surrounding cooling water 25, because shorter distances are present.

On the inlet-side end face the cross-section of the tank calibrator 21 is stepped in the present example (see FIG. 7), in order to fit into the opening of the end wall of the vacuum tank 3 (not shown here).

There are also bores for the cooling channels 29, whose number can however be smaller than in the dry calibrators 11, 12, because less heat must be dissipated.

In the concrete case of the tank calibrator 21, 22, 23, 24 shown in FIG. 6 or 7, the cooling channels 29 are charged with cooling water about centrally, which cooling water then flows out freely via the two end faces of the tank calibrators 21, 22, 23, 24 and into the water bath 25. Feeding the cooling water can be effected either laterally, from above or from below, depending on the space conditions in the vacuum tank 3.

Bores suitable for this purpose are shown in FIG. 6. The vertical and horizontal supply bores 28 intersect and serve the distribution of the cooling water. Bores not required for ports are closed.

Figure 9:
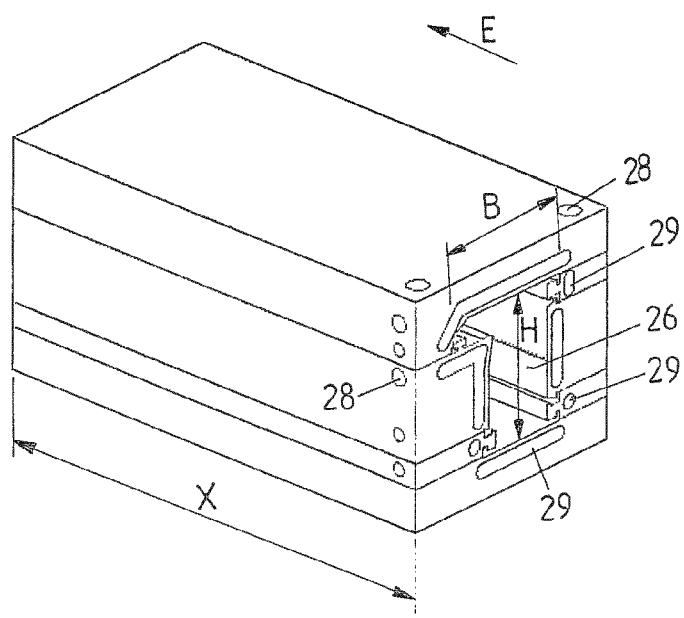
FIG. 9 shows a second embodiment of a tank calibrator.

FIG. 9 shows a second embodiment of a tank calibrator 21, 22, 23, 24. The tank calibrator according to FIG. 9 differs from the one according to FIG. 6 merely by a different design of the water supply and the missing shoulder. In this case, the cooling water supply via the supply bores is not positioned centrally, but close to the inlet-side end face. To prevent a large part of the cooling water from flowing out at the nearest end face, the longitudinal bores are closed here.

Figure 10:
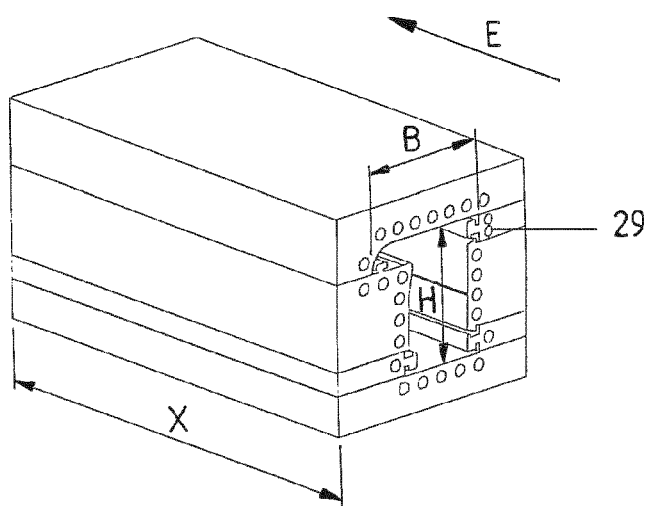
FIG. 10 shows a third embodiment of a tank calibrator.

In the third embodiment of a tank calibrator 21, 22, 23, 24 according to FIG. 10 no external cooling water supply is provided. The longitudinal bores 29 for cooling water do exist, however. A certain amount of water can flow through the same, when the same correspond with cooling water outlets of an adjacent tank calibrator 12 (not shown in FIG. 10) in axial alignment.

The cooling water which is used for charging the tank calibrators 21, 22, 23, 24 or which is introduced into the vacuum tank 3 through another connecting point must be sucked off from the tank space via a suction opening. Preferably, this suction point is positioned at the height of the desired water level in a side wall of the vacuum tank 3. It is particularly advantageous when the suction opening directly is in line connection with a water pump. Experience has shown that malfunctions frequently occur when this water pump is operated only briefly without inflow of water. The negative pressure in the tank then effects that air is sucked into the tank through the water pump against the normal flow direction of the water. Without special measures, the water pump in this case is unable to resume the pumping operation.

Figure 11:
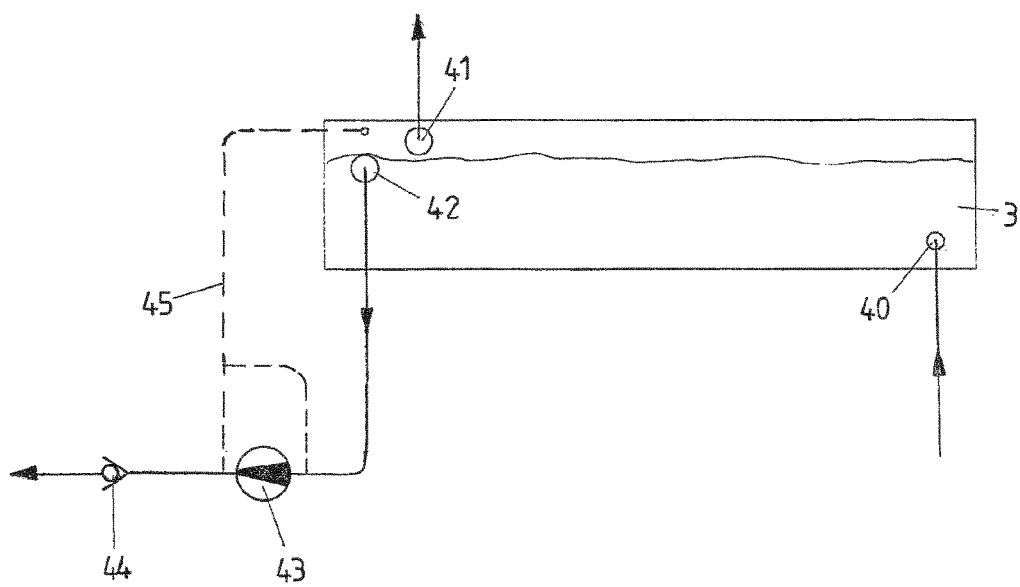
FIG. 11 shows an embodiment of a cooling water removal by suction.

FIG. 11 schematically shows the flow of media in the vacuum tank 3. The vacuum tank 3 is charged by cooling water, here represented by an inflow opening 40 at the right end. A further opening 41, preferably located at the uppermost edge, serves for connection to a vacuum pump. Entering air accumulates at the top of the tank space and therefore is sucked off at the top.

Since the vacuum tank 3 is under negative pressure, the cooling water supplied cannot flow out easily. It is expedient to provide a water suction opening 42 at the height of the desired water level and to connect the same with a water pump 43 via a hose line. It hence is ensured that the water pump 43 cannot drain the vacuum tank 3, so that no particular regulation for the height of the water level is required.

To prevent the above described malfunctions after brief idling of the water pump 43, a check valve 44 is provided on the pressure side of the water pump 43. Furthermore, a pressure compensation line 45 is provided between the pressure side of the water pump 43 and the vacuum tank 3 or the respective vacuum pump.

The pressure compensation line 45 effects that air entered after an interruption of the water delivery can be sucked off from the pump space of the water pump 43 and thus the cooling water can flow into the pump space, in order to be conveyed on by the water pump 43. When an air bubble has penetrated into the water pump 43, the same does not operate properly.

Alternatively, the pressure compensation line 45 can be connected on the suction side of the pump. In this case, the water pump steadily also conveys some air in partial load operation. Greater fluctuations in throughput thereby are inhibited, because the inflowing water cannot be conveyed on with full suction pressure, as no higher negative pressure can form on the suction side than is specified by the pressure compensation line 45. The cooling water is flowing freely, so to speak, up to the pump. Thus, it is not possible either to briefly suck off more water than can flow in freely through the line. The cross-section of the suction line and the static height of the water level therefore determine the maximum suction capacity of the pump, when the pump per se has a higher throughput capacity.

LIST OF REFERENCE NUMERALS

1 dry calibration device
2 tank calibration device
3 vacuum tank
11, 12 dry calibrators
13 inlet opening of the dry calibrator
21, 22, 23, 24 tank calibrators
25 water bath
26 opening of tank calibrator (for the profile)
27 running surface in tank calibrator for profile
28 supply bore
29 cooling channels
30 sealing element (O-ring)
31 bore in the sealing region
32 sealing element (sealing lip)
40 inflow opening for cooling water
41 opening for vacuum suction
42 water suction opening for cooling water
43 water pump
44 check valve
45 pressure compensation line
100 calibration device
E extrusion direction
X length of a tank calibrator
B width of the profile
H height of the profile

The invention claimed is:

1. A calibration device for extrusion of profiles from plastics, the calibration device comprising: a vacuum tank including an inflow opening, a further opening configured to be connected to a vacuum pump, and a water suction opening configured to be connected with a water pump or the vacuum pump; and at least two tank calibrators each including an opening and a running surface for the extruded profiles, which are configured to be positioned in the vacuum tank with cooling water and heat from the extruded profiles can at least partly be transferred to the cooling water via outer surface of the at least two tank calibrators, wherein: the at least two tank calibrators include at least one cooling channel for cooling the running surfaces, the at least one cooling channel can be flown through by water which originates from a cooling channel of an another tank calibrator upstream or downstream from the at least two tank calibrators, the water exits on one or on both end faces of the another upstream or downstream tank calibrator and enters into openings of cooling channels on an end face of an adjacent tank calibrator, axial length of the at least two tank calibrators at least corresponds to a height and/or a width of a nominal dimension of the extruded profiles, the vacuum tank is charged by the cooling water at the inflow opening, the further opening is located at an uppermost edge of the vacuum tank such that entering air accumulates at a top of the vacuum tank and sucked off via the further opening, and the water suction opening is positioned at a height of a predetermined water level such that the water pump cannot drain the vacuum tank.

2. The calibration device according to claim 1, wherein the at least one cooling channel of the at least one tank calibrator can be connected to a cooling water delivery or the at least one cooling channel can passively be flown through by cooling water.

3. The calibration device according to claim 1, wherein the at least two tank calibrators can be charged with cooling water via ports on the outside of each of the at least two tank calibrators and the cooling water on an end face of each of the at least two tank calibrators exits from the at least one cooling channel located close to the running surfaces.

4. The calibration device according to claim 1, wherein the at least two tank calibrators comprised of a first tank calibrator, wherein at a transition between the first tank calibrator and a dry calibrator device at least one sealing element is arranged.

5. The calibration device according to claim 4, wherein the at least one sealing element is formed as an axially acting O-ring seal and/or as sealing lip.

6. The calibration device according to claim 1, wherein an axially acting seal includes two sealing elements acting in series and that a space formed by the two sealing elements is chargeable either by negative pressure or by cooling water.

7. The calibration device according to claim 1, further comprising a manometer for measuring a pressure in the space between the two sealing elements.

8. The calibration device according to claim 1, wherein the vacuum tank is designed in a sealing manner, in order to largely inhibit entry of false air at sealing end-face connecting points to the succeeding vacuum tank and to an upstream dry calibration device.

9. The calibration device according to claim 1, wherein a negative pressure in the vacuum tank is adjustable and/or controllable between 0.05 bar to 0.8 bar or between 0.1 bar to 0.5 bar.

10. The calibration device according to claim 1, wherein the height of the water level in the vacuum tank is adjustable and/or controllable such that the same is higher than the extruded profile.

11. The calibration device according to claim 1, wherein at the vacuum tank the water suction opening for the cooling water is in line connection with the water pump and that on a pressure side of the water pump a check valve is arranged.

12. The calibration device according to claim 1, wherein between an air cavity of the vacuum tank and the water pump a pressure compensation line is arranged, which joins in before a water inlet of the water pump or behind the water inlet of the water pump and before the check valve of the water pump.

13. The calibration device according to claim 1, wherein a water throughput capacity of the water pump is controllable in dependence on the height of the water level in the vacuum tank.

14. The calibration device according to claim 1, wherein the vacuum tank is equipped with a removable side wall on one long side or on both long sides.

15. The calibration device according to claim 1, wherein the distance between the at least two tank calibrators is between 0 mm and 50 mm.

16. The calibration device according to claim 1, wherein one of the at least two tank calibrators is coupled with one to four dry calibrator devices.

17. The calibration device according to claim 1, wherein the axial length of the at least two tank calibrator is at least 200 mm or 100 mm.

18. The calibration device according to claim 1, further comprising a check valve and a pressure compensation line, wherein the check valve is located on a pressure side of the water pump or the vacuum pump and the pressure compensation line is located between the pressure side of the water pump or the vacuum pump and the vacuum tank such that drainage of the vacuum tank by the water pump is prevented after brief idling of the water pump.

* * * * *